United States Patent [19]
Gupta et al.

[11] Patent Number: 5,099,473
[45] Date of Patent: Mar. 24, 1992

[54] PORT CONCENTRATOR

[75] Inventors: Dev V. Gupta, Flemington; Y. Brian Chen, Somerville; Keven Stiffler, Glen Gardner, all of N.J.

[73] Assignee: Integrated Network Corporation, Bridgewater, N.J.

[21] Appl. No.: 556,008

[22] Filed: Jul. 20, 1990

[51] Int. Cl.$^5$ .......................................... H04Q 11/00
[52] U.S. Cl. .................................... 370/56; 370/58.1; 370/94.1
[58] Field of Search .................... 370/56, 58.1, 94.1

[56] References Cited

U.S. PATENT DOCUMENTS

| | | | |
|---|---|---|---|
| 4,112,260 | 9/1978 | Kurokawa et al. | 370/56 |
| 4,559,624 | 12/1985 | Reo et al. | 370/56 |
| 4,566,097 | 1/1986 | Andon et al. | 370/56 |
| 4,737,950 | 4/1988 | Fecholos | 370/56 |
| 4,924,457 | 5/1990 | Shimiyu | 370/56 |

FOREIGN PATENT DOCUMENTS 2097224 10/1982 United Kingdom .................. 370/56

*Primary Examiner*—Douglas W. Olms
*Assistant Examiner*—T. Samuel
*Attorney, Agent, or Firm*—Hamilton, Brook, Smith & Reynolds

[57] ABSTRACT

A port concentrator communication system which allows a large number of end user stations to share a limited number of trunk lines to a packet switch network is described. Specifically, the system comprises a number of end user stations each coupled to a port concentration intelligent unit, with these units being coupled together in cascade fashion and the end unit in the cascade being coupled to a set of trunk lines leading to a packet switch network. Each of the trunk line ports corresponds to a channel in the DDS DSOB data streams network and in the reverse direction to the set of end user stations. Special code bytes, indicating the status of trunk line ports, appear in the DSOB data streams and play an integral role in the method whereby the port concentration intelligent units associated with the end user stations can request, obtain access to and communicate over, and relinquish trunk lines.

17 Claims, 11 Drawing Sheets

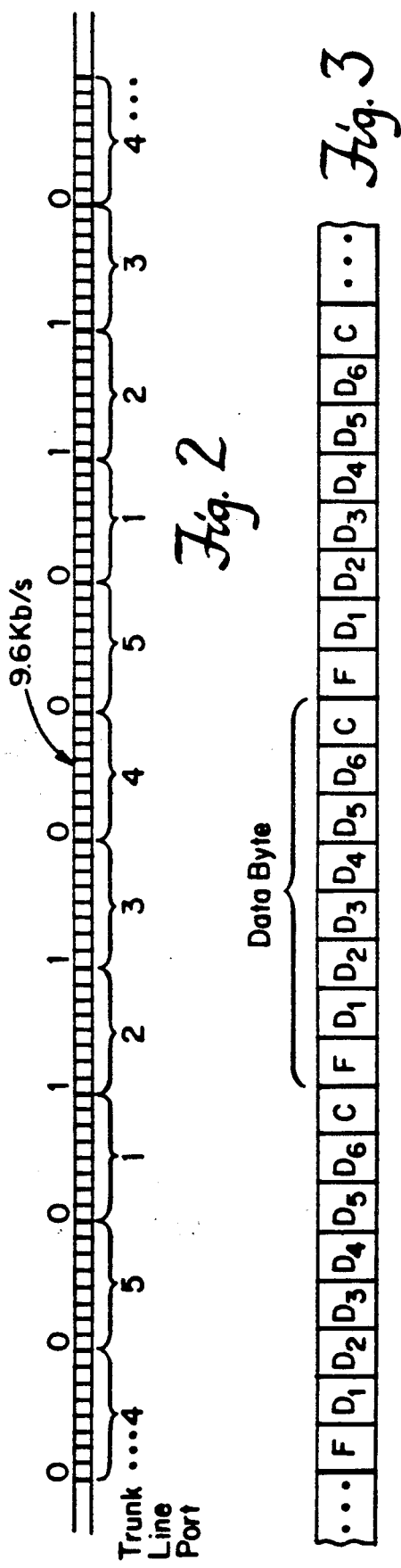
Fig. 2
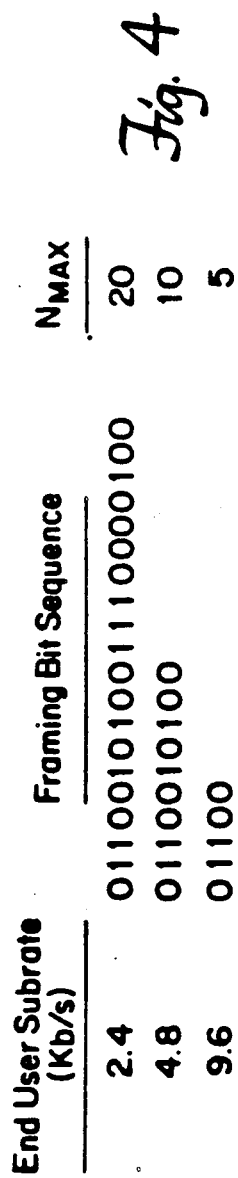
Fig. 3
| End User Subrate (Kb/s) | Framing Bit Sequence | $N_{MAX}$ |
|---|---|---|
| 2.4 | 011001010011110000100 | 20 |
| 4.8 | 0110010100 | 10 |
| 9.6 | 01100 | 5 |
Fig. 4
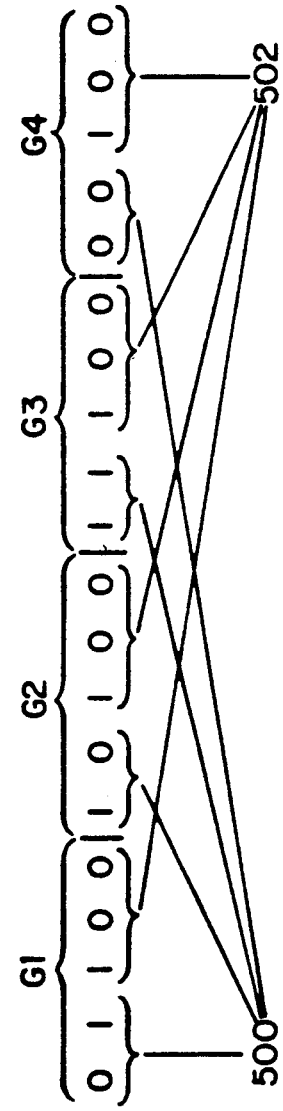
Fig. 5

PORT CONCENTRATOR

TECHNICAL FIELD

This invention is in the field of digital data communication systems.

BACKGROUND ART

In many digital data communications applications, a large number of end users communicate with a host computer over a packet switch network (PSN). For example, a large number of lottery ticket machines communicate with a host computer at lottery headquarters, transmitting lottery numbers and receiving acknowledgements that these numbers have been entered in the lottery. Another example is that of credit card verification, in which a large number of retail stores communicate with a host computer to determine whether purchases fall within their customers' credit limits.

In applications such as these, each end user is connected to the PSN by a trunk line. However, since a given end user needs to communicate with the host computer only occasionally, each trunk line to the PSN (and hence to the host computer) is frequently idle. Hence dedicating a trunk line to each end user is wasteful and costly.

SUMMARY OF THE INVENTION

An alternative that considerably lowers PSN-access costs is provided by the present invention, the port concentrator. The basic strategy used by the port concentrator is to allow a large number of end users to time-share a small number of trunk line ports to the PSN, thereby reducing idle time and expense. In a typical port concentrator system, the ratio of end users to trunk line ports is on the order of ten.

More specifically, the port concentrator serves as an interface between the end users and a limited number of trunk line ports, assigning trunk line ports to the end users on a first-requested-first-served basis. The data from each of the end users that have requested and have been assigned a trunk line is multiplexed into a single high rate communication line. At the trunk line end, the data corresponding to each user (and hence to each trunk line) is extracted from the high rate data stream by demultiplexing. Communication in the reverse direction takes place in much the same way. That is, data being sent from the host computer to a number of end users that have been assigned trunk lines is first multiplexed, then transmitted over the high rate channel, and finally demultiplexed for transmission to the individual end users.

Each end user is assigned a port concentration intelligent (PCI) unit having three communication ports. The end user equipment is coupled to a first such port (A), and the remaining ports (B and C) are connected in tandem such that the second port of a first PCI unit is coupled to the third port of the next adjacent PCI unit, until the last PCI unit, which is connected to a plurality of trunk lines leading to a PSN. Data travels along the cascaded chain of PCI units in a first direction (A), from the first PCI unit in the cascade toward the PSN, and in a second direction (B), opposite to direction A.

A PCI unit primarily consists of the three communication ports mentioned above as well as data processing circuitry and bypass circuitry. The data processing circuitry, in turn, consists of a programmable processing circuit (PPC), a microprocessor controller, and an EPROM memory. The controller, by reading data bits stored in the EPROM, programs the PPC with a hardware configuration that enables it to perform the port concentration function. Furthermore, the controller directs the operation of the PPC in response to various status signals. The bypass circuit provides data streams A and B with a route that bypasses a portion of the PCI unit circuitry—and in particular, the PPC—entirely. This bypass is used in the event that the PPC is being programmed by the controller or in the event that some part of the PCI has failed. The PPC, coupled to port A leading to the end user, is coupled to the bypass circuit, which is coupled to ports B and C, through which data streams A and B travel, respectively.

Each trunk line port is associated with certain data byte positions in each of data streams A and B. This correspondence is periodic with a period of $N_{max}$ bytes (or equivalently $N_{max}/8000$ secs), so that each data stream can be thought of as consisting of $N_{max}$ channels. Hence, every $N_{max}{}^{th}$ data byte belongs to a particular channel, or trunk line port.

When an end user equipment requests its PCI unit for a trunk line to the PSN, the request is received at the PPC via port A. The controller inspects data streams A and B (which arrive at the PPC via ports B and C and the bypass circuit), to determine the presence of certain special code bytes that indicate which byte positions, or channels, in the high rate communication line, if any, are idle.

If an idle channel exists, the controller accesses it for the use of its end user. The end user is then able to transmit data to and receive data from the PSN over this channel until it no longer requires the use of the channel. To be specific, in the PPC, the end user data from port A is multiplexed into the appropriate positions of data stream A arriving from port B and is transmitted through port C. Also, data bytes in the appropriate positions of data stream B received through port C are extracted and transmitted through port A to the end user. Finally, a 'busy' signal in the form of a special code byte is inserted into the appropriate byte positions of data stream B (thereby indicating to other PCI units that these byte positions are being used by another PCI unit) to replace the extracted data, and is sent out through port B.

If an idle channel does not exist, the controller continues its search, waiting for the first channel to be relinquished by another end user. Meanwhile, data streams A and B propagate through the PCI unmolested, i.e., the PCI is transparent to the data streams.

BRIEF DESCRIPTION OF THE DRAWINGS

FIG. 2 depicts a DS0B data stream in which the end user subrate is 9.6 kb/s. The figure illustrates the correspondence between the framing bits of consecutive data bytes and trunk line ports.

FIG. 3 illustrates the bit format of a DS0 data byte.

FIG. 4 lists the framing bit sequences that correspond to the standard end user subrates.

FIG. 5 illustrates the structure present in a framing bit sequence (here, at 2.4 kb/s).

DETAILED DESCRIPTION OF THE INVENTION

A detailed description of the invention now follows in connection with FIGS. 1–9. The description is divided into four sections: (I) the architecture of the port concentrator system; (II) the data formats and conventions used throughout the system; (III) the method by which end users may be connected to trunk lines leading to a packet switch network; and (IV) the operation of the programmable processing circuit configured to perform the port concentrator function.

I. System Architecture

Figure 1:
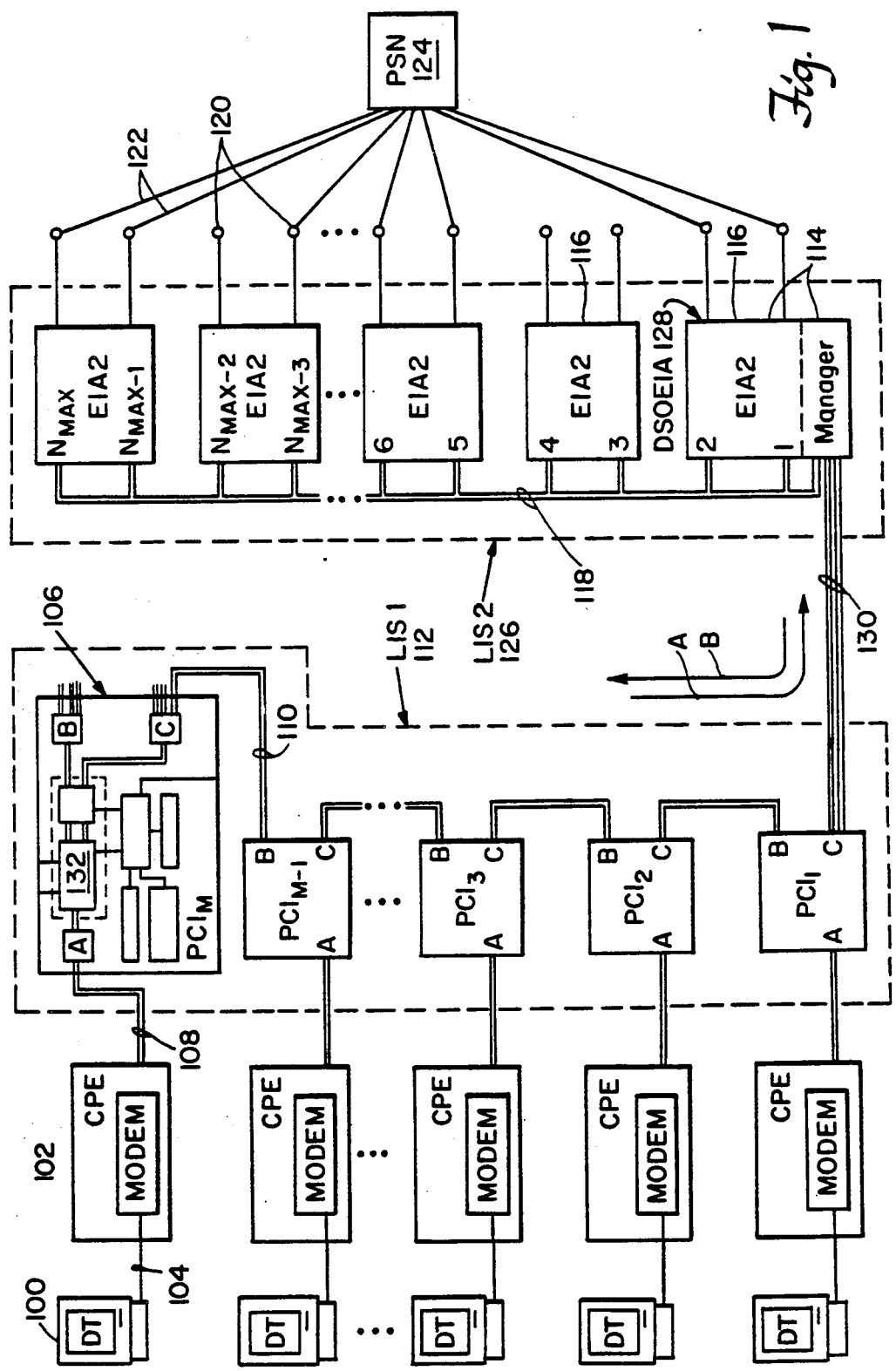
FIG. 1 is a block diagram of the entire port concentrator system.

FIG. 1 illustrates the port concentrator system of the invention in block diagram form. A number of end user data terminals 100 are each connected to Customer Premises Equipment (CPE) 102 (e.g., a modem) via a standard RS-232 interface 104. Each CPE 102 is in turn connected to an Intelligent Channel Unit (ICU) (see co-pending U.S. patent application Ser. No. 556,010, filed July 20, 1990 and incorporated herein by reference) configured as a port concentration intelligent (PCI) unit 106. The CPE-to-PCI connection is made at Port A of the PCI unit using a two-wire interface 108. Data communication across this interface is carried out in 'ping-pong' fashion, as described in U.S. patent application Ser. No. 07/159,887, now U.S. Pat. No. 4,953,160, issued Aug. 28, 1990.

Briefly, in the ping-pong communication protocol, the data being sent from the CPE to the PCI is time compressed and multiplexed (TCM) by TCM logic circuitry (not shown) before being sent to the PCI in a series of short bursts, at an effective data rate of 19.2 kb/s. TCM logic circuitry at Port A of the PCI processes data in a similar manner before transmitting it in the opposite direction to the CPE in another series of short bursts, again at an effective rate of 19.2 kb/s. The CPE-to-PCI and PCI-to-CPE data bursts are interleaved in time, so that communication along the two-wire interface is in only one direction at any given time.

A plurality of PCI units 106 labelled $PCI_M$, $PCI_{M-1}$, ..., $PCI_1$, are connected together in cascade such that Port C of the $i^{th}$ PCI is connected to Port B of the $(i+1)^{st}$ PCI via a DS0-TTL two-wire bipolar interface 110 that provides a full duplex connection. This cascade connection, which forms a daisy-chain of PCI's, is implemented by plugging the individual PCI units 106 into adjacent slots in the backplane of a Line Interface Shelf (LIS) 112.

The topology of the other half of the system is similar. Each of $N_{max}/2$ (with $N_{max}$ as defined below) Electronics Industries Association (EIA) units 114 and 116 serves as a standard interface between a full-duplex DS0-TTL bus connection 118 and two standard RS-232 ports 120. As described later, an EIA unit not only serves as a DS0-to-RS-232 interface but also multiplexes and demultiplexes data into/from the transmitted and received DS0 data streams. Note also that the DS0 bus connection 118 enables data on the bus to reach all of the EIA's simultaneously. In contrast, the daisy-chain connecting the PCI units gives rise to a hierarchy among the connected units. The RS-232 ports on the EIA are referred to as trunk line ports, and are connected to trunk lines 122 that lead to a packet switch network (PSN) 124. Note that none, one, or both of the trunk line ports on an EIA unit may have trunk lines connected to them (as illustrated in FIG. 1). In a typical implementation, there are on the order of ten times the number of end users as there are trunk lines to the PSN, thereby providing a 10:1 port concentration. The maximum number of trunk line ports is $N_{max}$. Clearly $N_{max}$ is greater than or equal to N.

The EIA units are connected to the DS0 bus using a second LIS 126. The first EIA unit is more specifically referred to as a DS0EIA 114, while the last $N_{max}/2-1$ EIA units are referred to as EIA2's 116. The distinction is due to the fact that the first unit, the DS0EIA 114, performs certain 'managerial' functions in addition to the standard EIA2 functions, as is indicated in the figure by the DS0EIA block being subdivided into two components: an EIA2 unit 116 and a manager unit 128. While the EIA2 is connected to the DS0 bus just as the other EIA2's are, the manager unit controls the contents of the bus. Specifically, as the manager receives DS0 data from the daisy-chain of PCI's (in particular, port C of $PCI_1$) over the full duplex DS0-4-wire interface 130, it places the data on the bus, thereby making it available to the EIA2 units. Similarly, when the EIA's are ready to transmit data to the PCI chain, the manager instructs them to place their data on the bus and then transmits the contents of the bus to port C of $PCI_1$ over the 4-wire interface 130.

II. Data Format

The particular data communication format used in the present system is the DS0B format, shown in FIG. 2. In a DS0B data stream, consecutive data bytes correspond to different end users simultaneously communicating over the DS0B interface. However, it is more appropriate to think of the consecutive data bytes as belonging to different trunk line ports, or 'channels' since end users may jump back and forth among the different data bytes on a DS0B data stream as they intermittently communicate with the PSN. The maximum number of trunk lines ($N_{max}$) that can be accommodated (i.e., the number of trunk line ports) is equal to the maximum number of end users that can simultaneously communicate over the DS0B interface and depends on the relationship between the subrate at which the end users are operating and the standard DS0B rate of 64 kb/s. In particular, it can be shown that the maximum number of DS0B channels that are available for the standard data rates of 2.4 kb/s, 4.8 kb/s, and 9.6 kb/s is 20, 10, and 5, respectively. It follows that, in the architecture of FIG. 1, the number of trunk line ports $N_{max}$ is either 20, 10, or 5 depending on the subrate being used. Thus in a system in which the end user subrate is 9.6 kb/s (as in FIG. 2), five consecutive data bytes in the DS0B data stream belong to five different channels, or equivalently, every fifth data byte belongs to a particular one of the trunk line ports 120 of FIG. 1.

A more detailed description of the data format used and data communication conventions followed throughout the present system is provided in accordance with FIG. 3. As shown in FIG. 3, a data byte corresponding to the DS0 standard consists of a framing bit F followed by six bits of user data $D_1, D_2, \ldots, D_6$ and a control bit C. The data bytes appear in a stream of 64 kb/s data, in a manner such that the first data byte corresponds to the first trunk line port, the second byte corresponds to the second port, and so on until the $N_{max}^{th}$ byte, which corresponds to the $N_{max}^{th}$ port. This correspondence is true of all preceding and subsequent sets of $N_{max}$ consecutive bytes in the data stream, so that the $(kN_{max}+i)^{th}$ byte corresponds to the $i^{th}$ trunk line port, where k is an arbitrary integer and i is an integer between 1 and $N_{max}$ inclusive. Hence, every $N_{max}^{th}$ byte in the data stream corresponds to a particular trunk line port.

The framing bits of consecutive bytes in the DS0B data stream form a predetermined periodic sequence. This sequence differs for each of the end user subrates (i.e., 2.4 kb/s, 4.8 kb/s, and 9.6 kb/s), as shown in FIG. 4, and has a period of $N_{max}$ bytes, the subrate-dependent parameter defined above. Hence, the framing bit sequence (for a particular subrate) provides the correspondence between data bytes in the DS0B data stream and trunk line ports (see the correspondence between data byte framing bits and trunk line port numbers in FIG. 2). It is, therefore, possible to identify the trunk line port number that corresponds to a particular data byte by examining the framing bit of the data byte (call this framing bit F*) together with the framing bits of $N_{max}-1$ other bytes chosen so that the $N_{max}$ bytes are consecutive in the data stream, and then noting the position of the framing bit F* in the sequence shown in FIG. 3. However, this would require the examination of ten and twenty framing bits for the two lower subrates.

In fact, there is a structure to the two lower subrate framing bit sequences which allows trunk line port number identification upon examination of only five consecutive framing bits. To be specific, consider the 2.4 kb/s case. On dividing the sequence of twenty framing bits into four groups $G_1$, $G_2$, $G_3$ and $G_4$ of five bits as shown in FIG. 5, we see that the first two bits in each group are 'counting bits' 500, counting '1,2,3,0' in binary. In contrast, the last three bits 502 in each group are always '100.' Finally, no other sequence of in the twenty bit sequence is '100.' As three bits in the twenty bit sequence is '100.' As a result, given a sequence of five consecutive framing bits in which one of the five bits is the framing bit of the data byte in question, first the '100' sequence and then the values of the counting bits can be identified. Once the values of the counting bits are known, the location of the framing bit F* in the twenty bit sequence can be pinpointed, thereby permitting trunk line port number identification. The procedure for port number identification in the 4.8 kb/s case is essentially the same as that in the 2.4 kb/s case with the exception that the sequence is ten framing bits long, giving rise to only two groups of five bits and a counting pattern of '1,2' instead of '1,2,3,0.'

Referring back to FIG. 1, since the DS0B line 110, 130 is a full duplex interface, data flows in two directions. We refer to direction 'A' as being downward along the daisy-chain of PCI's and over to the DS0B bus connected to each of the EIA's. Direction 'B' denotes the reverse direction. The source 132 of data stream A is at the $M^{th}$ PCI, while the source of data stream B is at the DS0EIA manager unit 128.

In general terms, each of these sources transmits data streams in which the individual data bytes consist of special code bytes, in the case of stream A, and consist of either special code bytes or data sent from the PSN to end users, in the case of stream B. As these data bytes pass through the daisy-chain of PCI's, they may be replaced by data bytes transmitted by the end user, in the case of stream A, and by special code bytes supplied by a PCI, in the case of stream B.

There are three different special code bytes that are used: an 'idle' code byte, a 'busy' code byte, and an 'Unassigned MUX Channel' (UMC) code byte. These code bytes are 'F1111000,' 'F0001110,' and 'F0011000,' respectively, where the F bit in each byte simply cycles through the sequence of framing bits that is appropriate for the subrate being used by the end users, and contains information as to which trunk line port its byte corresponds, as discussed above.

An idle code byte in data stream A has its origin at source A, and has the following significance. If $PCI_i$ receives an idle code byte in a particular DS0B channel (with the channel corresponding to a particular trunk line port), then none of the PCI's closer to source A (i.e., no $PCI_j$ where j is greater than i) is communicating with the PSN 124 through that particular DS0B channel. This is because if some PCI closer to source A than $PCI_i$ were communicating in that DS0B channel, it would be inserting its data into and extracting received data from that DS0B channel, thereby replacing any idle byte previously in that channel. An idle code byte in data stream B, on the other hand, has its origin at source B and indicates that its trunk line port is available for communication.

A busy code byte can be present only in data stream B, and has the following function. If $PCI_i$ 106 is communicating over a particular DS0B channel, then it inserts a busy code byte into that DS0B channel in data stream B so as to indicate to all of the PCI's closer to source A that that particular DS0B channel is being used and is therefore not available. Hence the busy code byte in data stream B and the idle code byte in data stream A play essentially the same role: just as the busy code byte (being transmitted by $PCI_i$) notifies all PCI's closer to source A than the $i^{th}$ PCI that the DS0B channel corresponding to the busy code byte is not available, the stream A idle code byte notifies any PCI that receives it that none of the PCI's closer to source A are using the idle code byte's channel.

The last special code byte is the UMC code byte, which may be present only in data stream B and has as its source slot 1 on the DS0EIA. The presence of the UMC code byte in the data stream indicates that the trunk line port corresponding to the UMC code byte has no trunk line attached to it. Thus no communication can take place over the associated DS0B channel.

III. Method of Connection

The method through which end users may request, obtain, and relinquish trunk lines connecting them to the packet switch network will now be described. The description is casewise exhaustive, with the five following cases being treated: (1) All trunk lines are idle, an end user requests a trunk line; (2) At least one trunk line is engaged, at least one trunk line is idle, an end user requests a trunk line; (3) At least two end users simultaneously request trunk lines; (4) All trunk lines are engaged, an end user requests a trunk line; and (5) An end user relinquishes a trunk line.

Figure 6A:
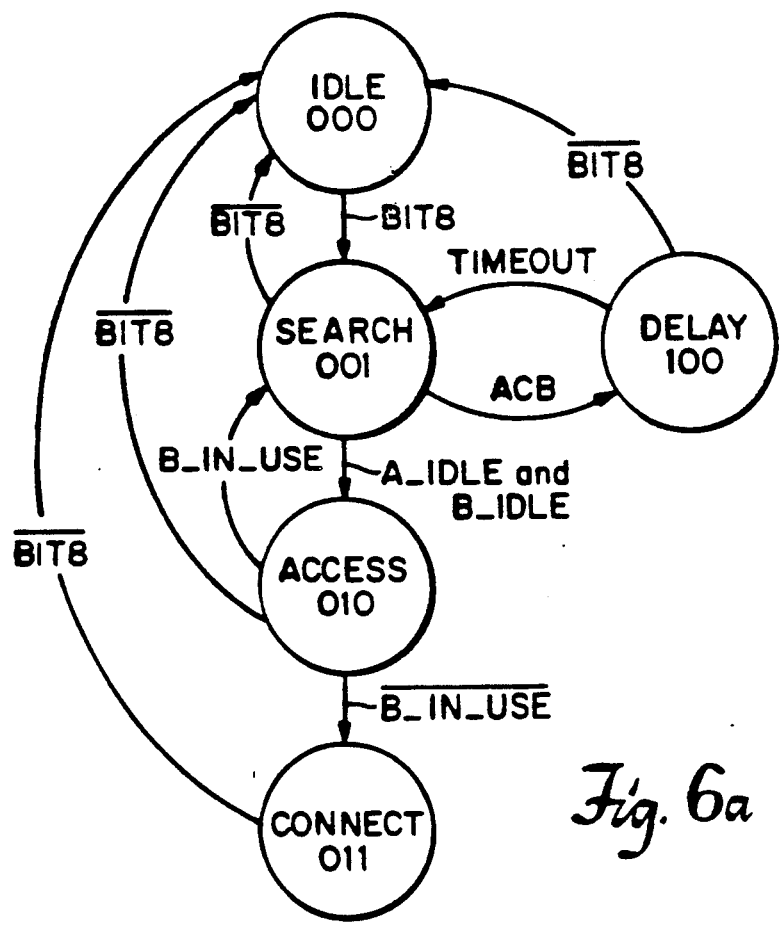
FIG. 6a is a state diagram of the finite state machine whereby end users access and relinquish trunk lines for communication.
Figure 6B:
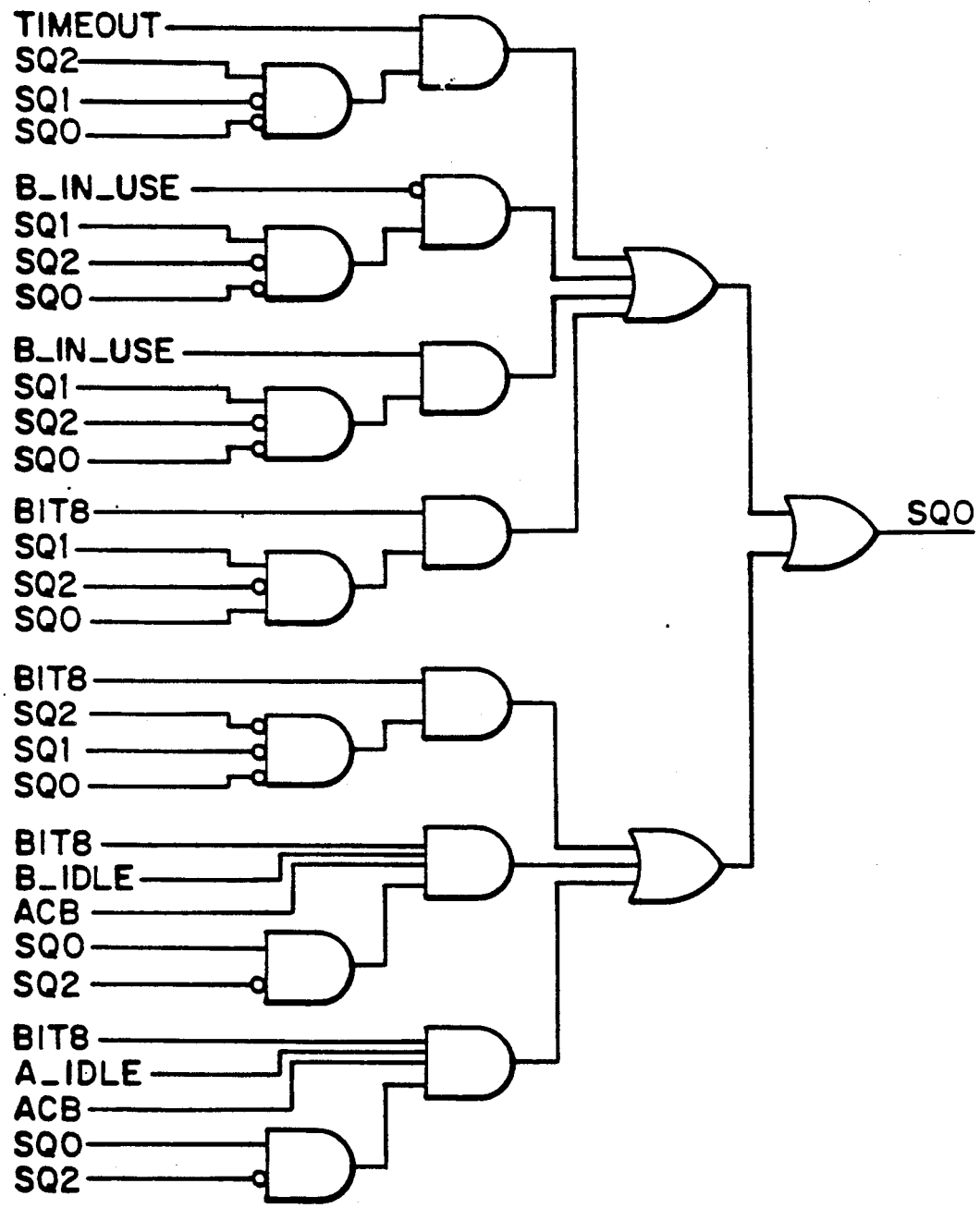
FIG. 6b is a hardware implementation of this finite state machine.
Figure 6B:
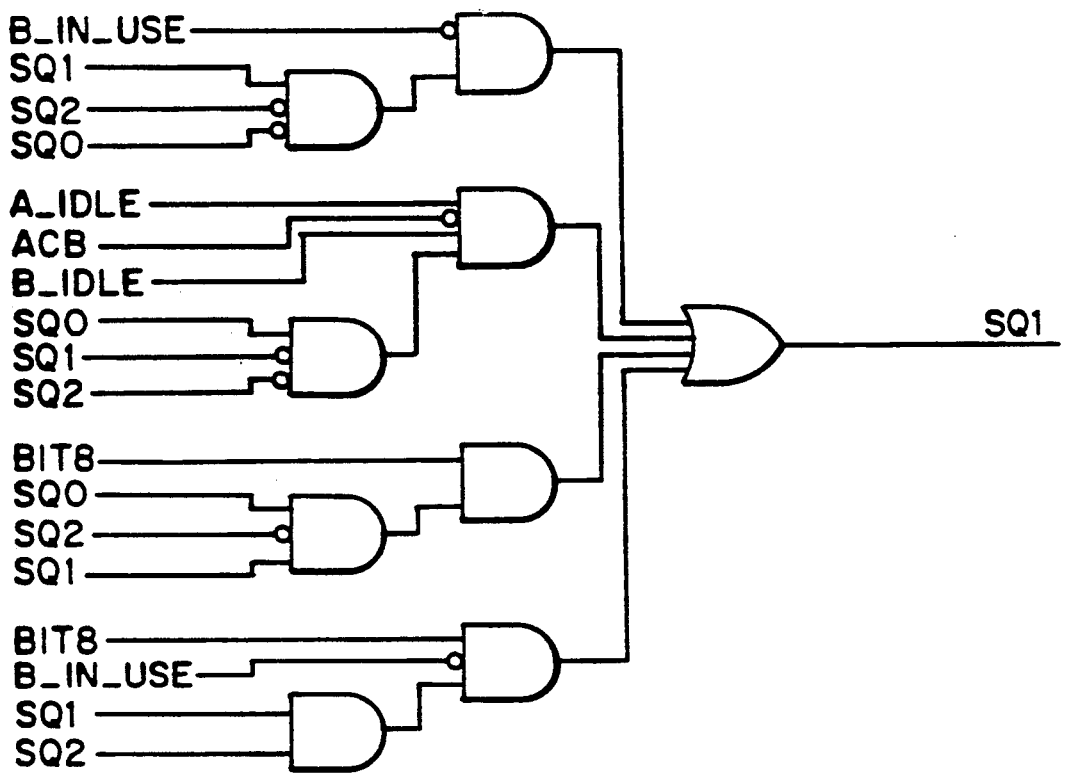
Figure 6B:
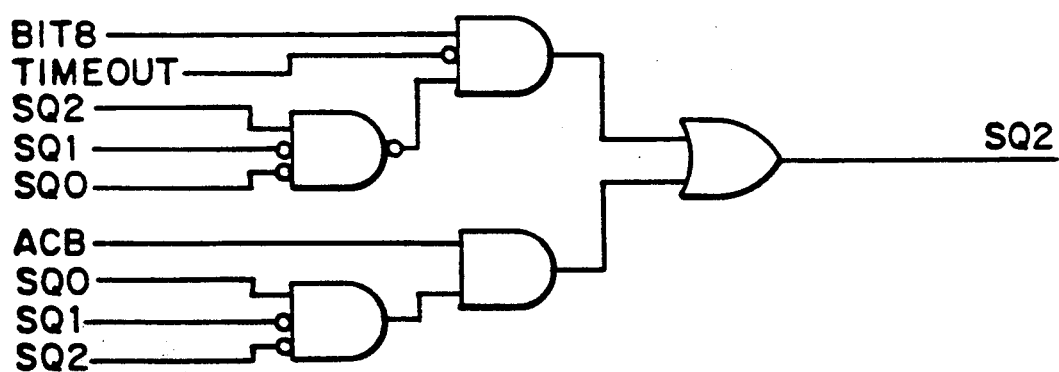

FIG. 6a is a state diagram of the finite state machine (FSM) programmed into the PCI to implement the method of connection. The FSM has five states, each of which is represented by a sequence of three bits SQ2, SQ1, SQ0. For example, for the CONNECT state (state 011), SQ2='0' and SQ1=SQ0='1' FIG. 6b shows the combinational logic circuitry used to implement the FSM of FIG. 6a in hardware. Note that no flip-flops are used in the FIG. 6b implementation since the FSM is purely asynchronous.

A: Case 1—All Trunk Lines Idle

In case (1), an end user requests a trunk line at a time when none of the trunk lines are in use. Prior to the request, every byte in data stream A is an idle code byte, since none of the PCI's are communicating data. In addition, every byte in data stream B is either an idle code byte (for the byte positions that correspond to those trunk line ports which have trunk lines attached to them) or a UMC code byte (if the associated trunk line port is empty). Each of the PCI units continually transmits and receives the special code byte control mode idle (CMI), given by '11111110', to and from its corresponding CPE over TCM loop 108 via the ping-pong communication method described above.

When one of the end users, say the $i^{th}$ end user, is ready to send data to the PSN, it notifies its CPE using a standard RS-232 handshake protocol. That is, it asserts a Request-to-Send (RTS) signal by setting a single bit high. This is received by $CPE_i$, which in turn sends the special code byte mark hold, given by '11111111', to $PCI_i$. The fact that the control bit (bit 8) of each byte in the mark hold data byte is '1' rather than '0' (as is the case with the CMI code bytes previously being transmitted to $PCI_i$ by $CPE_i$) indicates to $PCI_i$ that its end user station wishes to be connected to the PSN by a trunk line.

Referring now to FIG. 6, the transition of bit 8 from '0' to '1' causes the PCI to switch from the IDLE state (state 000) to the SEARCH state (state 001). In the SEARCH state, the PCI examines the byte in data stream A that corresponds to the first trunk line port, determining whether or not it contains the idle code byte. The PCI also examines the data stream B byte for the same trunk line port to determine whether or not it too contains the idle code byte. If both data streams contain idle code bytes in the first port position, so that the logicals A_IDLE and B_IDLE are both asserted (they will, since we have assumed that no other end users are communicating), then the PCI enters the ACCESS state (state 010), replaces the idle code byte in stream A with the data byte it has received from its end user, and replaces the idle code byte in stream B with the busy code byte. At this point, the PCI inspects DSOB time slot #1 in stream B to determine whether or not it contains the busy code byte. Note that this busy code byte could appear only if another PCI closer to source B in the daisy-chain had seized time slot #1 at the same time as $PCI_i$ had (see Case 4 below). Since this is not the case, B_IN_USE is '0' and the PCI enters the CONNECT state (state 011), having been assigned time slot #1.

The PCI then notifies its CPE that it has received access to the PSN. This notification is accomplished by the PCI's transmitting the mark hold special code byte to the CPE instead of the CMI code byte that it had been transmitting. Once the mark hold code byte is received by the CPE, the CPE completes the RS-232 handshake with the end user by asserting a single-bit Clear-to-Send (CTS) signal which is read by the end user. This CTS signal indicates that a hard-wire full duplex interface directly connecting the $i^{th}$ end user to the first trunk line has essentially been established and will remain as such until the end user chooses to relinquish the trunk line, at which point the PCI returns to the IDLE state.

Until this is the case, the PCI inserts data bytes received from its end user into the correct DSOB positions and extracts data bytes received from the PSN in order to transmit them to the end user. Likewise, at the trunk line end of the system, the EIA unit corresponding to trunk line port #1 extracts the appropriate data bytes from the DSOB stream in order to transmit them to the PSN and inserts data bytes received from the PSN into the correct DSOB positions. The mark hold code bytes in the TCM loop are replaced by end user data and PSN data shortly after the PCI begins to communicate in the CONNECT state.

B: Case 2—One Trunk Line In Use

In case (2), an end user requests a trunk line at a time when at least one other trunk line is in use. When the new end user, say the $i^{th}$ end user, is ready to send data, it asserts an RTS signal and notifies $PCI_i$ of its intention to communicate in the manner described in case (1), i.e., via the CPE and the mark hold code byte. Referring again to FIG. 6, the PCI switches from the IDLE state to the SEARCH state due to the fact that bit 8 of the mark hold code bytes it now receives are '1' as opposed to the CMI bytes it had been receiving, which have bit 8 equal to '0'. As in case (1), in the SEARCH state, the PCI examines the bytes in data streams A and B that correspond to the first trunk line port to determine the presence of idle code bytes. If both streams contain the idle code byte in the first port position, then the PCI replaces the idle code byte in stream A with the data byte that it has received from its end user and replaces the idle code byte in stream B with the busy code byte. If, on the other hand, at least one of the data streams does not contain the idle code byte in the first trunk line port position, the PCI repeats the process for the second trunk line port, and so on, until it finds a trunk line port for which both data streams contain the idle code byte (which it will, since we have assumed in case (2) that at least one trunk line is idle).

At this point, the PCI enters the ACCESS state and checks the time slot to which it has tentatively received access for the presence of a busy code byte. As in case (1), there should be no busy code byte and consequently the PCI enters the CONNECT state, having been assigned a trunk line. The subsequent notification of access by the PCI to the CPE as well as the completion of the RS-232 handshake proceeds just as in case (1).

C: Case 3—Simultaneous Request of Trunk Lines

In case (3), at least two end users simultaneously request trunk lines, resulting in what is known as a state of contention. Let us denote the two end users as the $i^{th}$ and $j^{th}$ ones in the daisy-chain, with the $i^{th}$ one being closer to source A. When both end users assert RTS, their PCI's enter the SEARCH state via the process described for the preceding cases and begin to cycle through the trunk line port slots in data streams A and B, looking for the first available slot in which the idle code byte appears in both streams. Both PCI's seize the same slot, enter the ACCESS state, and start inserting their end user data into the slot in direction A and the busy code byte into the slot in direction B. We now note an important asymmetry in the operations of the two PCI's. Although $PCI_i$ sees $PCI_j$'s busy code byte, $PCI_j$ does not see $PCI_i$'s; instead, $PCI_j$ sees only $PCI_i$'s user data flowing in direction A, which it simply replaces with its own end user's data.

This distinction is important in that the presence of the busy code byte in a particular slot is an incontrovertible order to all PCI's receiving the busy code byte (i.e., all PCI's closer to source A) informing them not to use that slot as it is already in-use. However, once a PCI has obtained access to a slot (as both have, for the moment), even if it sees data in what it receives in stream A, it merely replaces the data with its own data; that is, it does not stop using the slot as it would if it were to see a busy code byte. Hence in this case $PCI_j$ would enter the CONNECT state and proceed to communicate using the trunk line port slot in question, while $PCI_i$ would be forced to return to the SEARCH state (since B_IN_USE equalled '1') and repeat its search for an idle slot. In the general case, a priority rule that determines which end user obtains the trunk line prevails, in which the end user farther from source A 'wins' the trunk line.

D: Case 4—All Trunk Lines In Use

In case (4), an end user requests a trunk line at a time when all of the trunk lines are in use. Here, the case (2) procedure is followed with the exception that the PCI cycles through all $N_{max}$ trunk line ports without finding the idle code byte in both data streams (A and B). That is, either or both of A_IDLE and B_IDLE are '0' and the PCI cannot enter the ACCESS state. Instead, since all channels are busy (ACB='1'), the PCI leaves the SEARCH state to enter a WAIT state, in which it waits for a short prespecified time period (say, 100 ms) before TIMEOUT changes from a '0' to a '1' and the PCI re-enters the SEARCH state to repeat its search. This process is continued indefinitely until one of two conditions is met: (a) a trunk line becomes available, i.e., A_IDLE and B_IDLE are both '1', allowing the PCI to enter the ACCESS state; or (b) the end user cancels its request, i.e., bit 8 of the bytes that the PCI receives from the CPE over the TCM loop changes from '1' to '0', so that the PCI enters the IDLE state. If a trunk line becomes available, the PCI enters the ACCESS state. The remainder of the connection protocol follows that in cases (1) and (2).

It is important to note what happens when several end users request trunk lines at a time when none are available. Specifically, consider a first end user i requesting a trunk line, where $PCI_i$ must switch from the SEARCH state to the WAIT state and remain in the WAIT state for some prespecified time period $T_i$. A short time after the $i^{th}$ end user has made its request (but has not yet been assigned a trunk line), another end user j requests a trunk line. Accordingly, $PCI_j$ must enter the WAIT state for some prespecified time period $T_j$ upon finding no idle time slots. In general, $T_i$ and $T_j$ may be different and in fact may be determined randomly by the controller 602 at the time that the PCI enters the WAIT state. Since both PCI's will cycle between the SEARCH and WAIT states, spending $T_i$ or $T_j$ seconds in the WAIT state and then an instant of time in the SEARCH state, both $PCI_i$ and $PCI_j$ will have the opportunity to seize a trunk line that becomes available in the meantime every $T_i$ and $T_j$ seconds, respectively.

Consequently, the fact that PCI's are forced to enter a WAIT state for some time period gives rise to a randomization process whereby the priority rule for trunk line assignment described above for case (3) is not followed, so that all of the PCI's that want a trunk line at a time when none are available have a chance at obtaining one. Without this randomization procedure, the PCI furthest from source B would always be the last one to obtain access to a trunk line during busy periods.

Note finally that there is one case in which the priority rule of case (3) still applies. This occurs when two or more PCI's have entered the WAIT state and have delay times such that they simultaneously emerge from the WAIT state and enter the SEARCH state at the same instant. Here, the priority rule would prevail and the PCI closest to source B would be assigned a trunk line if one were to become available. The others would reenter the WAIT state.

E: Case 5—Relinquishment of Trunk Line

Finally, we consider case (5), in which an end user relinquishes a trunk line. Once the end user is finished sending data, it deasserts RTS. The CPE resumes transmitting CMI (which has bit 8 equal to '0') to the PCI so as to notify the PCI of the end user's intention to end communication. The PCI enters the IDLE state and becomes 'transparent' in its treatment of the stream A and stream B data bytes corresponding to the trunk line port which was being used, allowing the idle code byte on stream A to pass by without being replaced by end user data and allowing the data byte (and after a short time, the idle code byte) on stream B to pass by without being replaced by a busy code byte.

Note that an end user may deassert RTS (thereby terminating its request for a trunk line) at any time. That is, if bit 8 of the data bytes that the PCI receives from the CPE changes from '1' to '0', the PCI immediately leaves its present state (which can be any of the SEARCH, ACCESS, WAIT, and CONNECT states) and enters the IDLE state.

IV. Port Concentration Intelligent Unit

Figure 7:
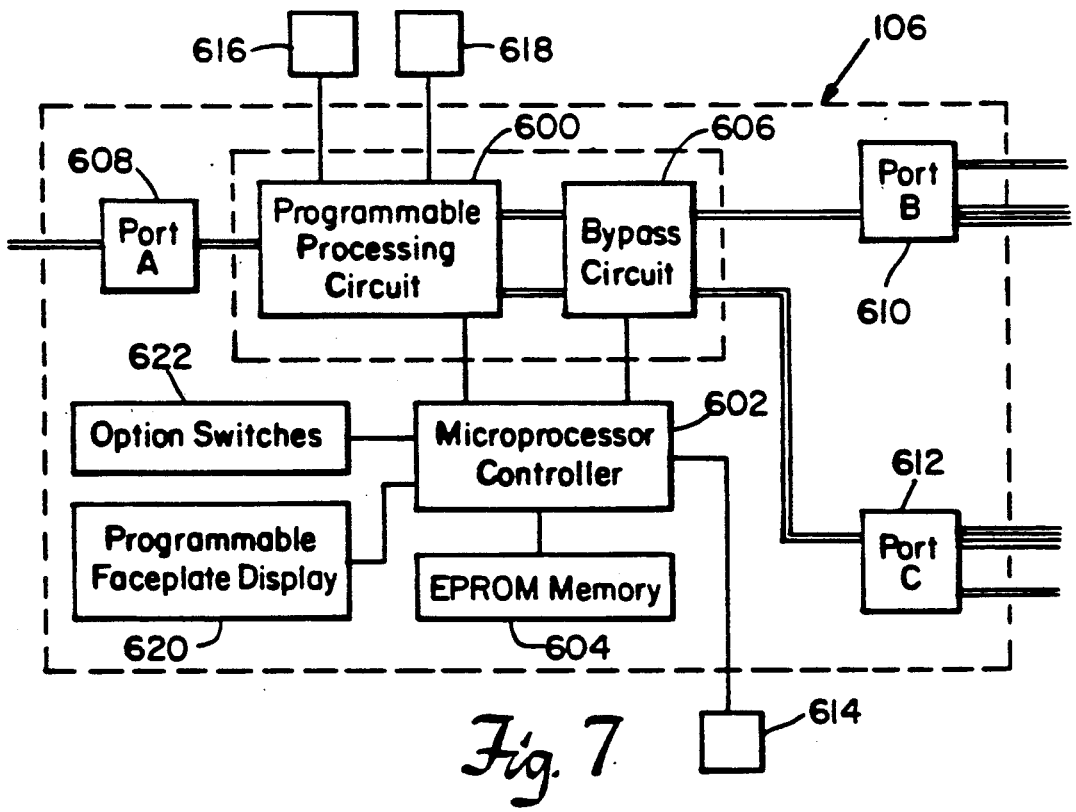
FIG. 7 is a block diagram of a Port Concentration Intelligent (PCI) unit.
Figure 8:
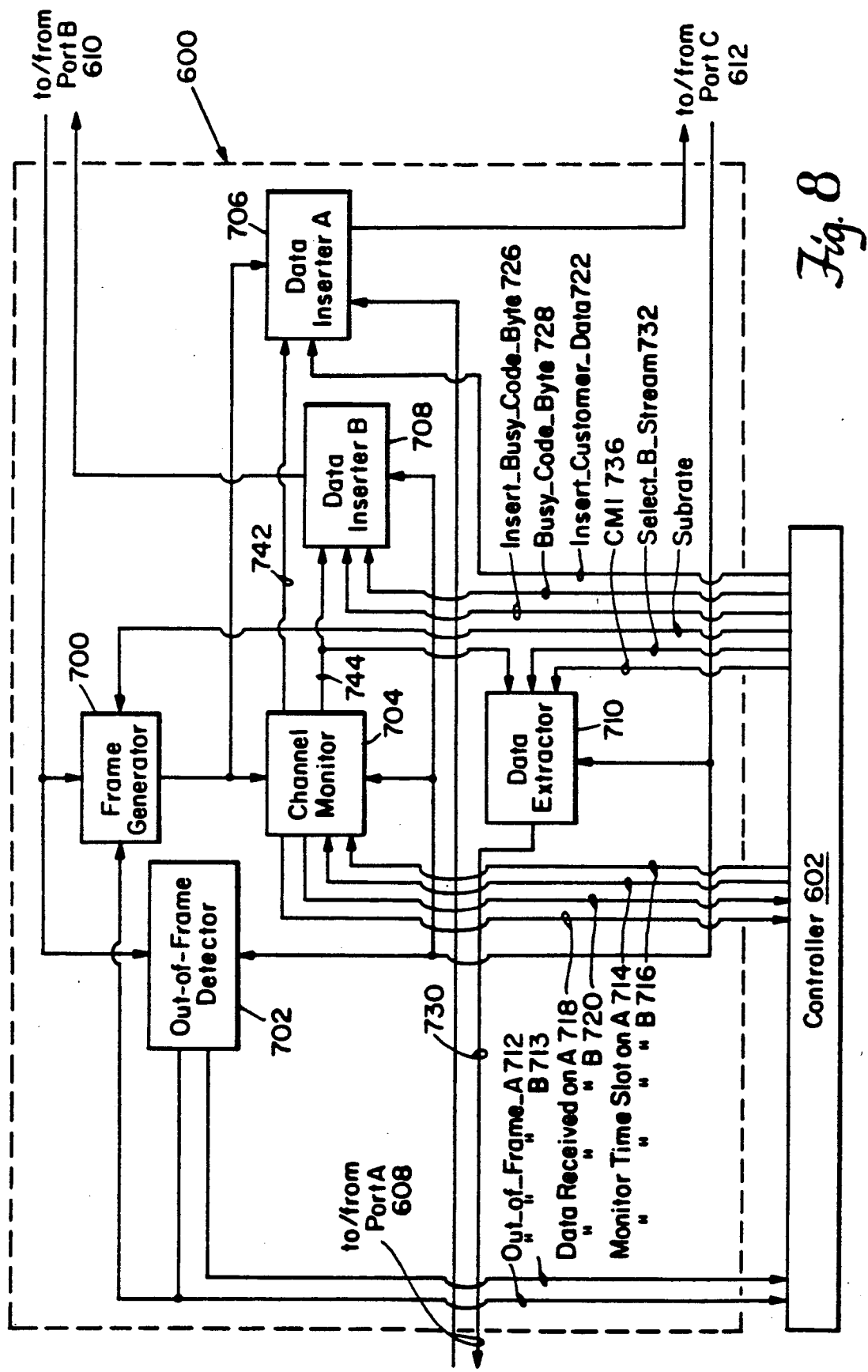
FIG. 8 is a block diagram of the port concentrator hardware configuration implemented using the programmable processing circuit of FIG. 7.

A more detailed description of the operation of an individual PCI unit—and, in particular, the programmable processing circuit that is the heart of the PCI unit now follows in connection with FIGS. 7 and 8. Recall that a PCI unit is simply an Intelligent Channel Unit (ICU) configured to perform the port concentration function. FIG. 7 depicts the structure of the PCI in block diagram form, with the PCI unit 106 consisting of a programmable processing circuit (PPC) 600 (implemented by a programmable gate array, such as a Xilinx SC3042-50), a microprocessor controller 602, an EPROM memory 604, a bypass circuit 606, three input/output (I/O) ports A 608, B 610, and C 612, control interface 614, maintenance interface 616 and faceplate test interface 618, a display panel 620, and mechanically-activated option switches 622.

Various predetermined hardware functions are stored in the form of data bits in EPROM memory 604. By reading the EPROM memory, the controller 602 is able to program the PPC 600 with a certain hardware configuration. Moreover, the controller 602 also controls data flow through ports A, B, and C as well as the operation of the PPC through software instructions stored in the EPROM 604. The bypass circuit 606 primarily serves as an alternate route for data in the event of chip failure. For further details concerning the architecture and operation of the ICU, see previously referenced co-pending U.S. patent application Ser. No. 556,010 incorporated herein by reference. During normal operation, an individual PCI unit performs a number of functions: inserting and extracting data from each of data streams A and B, examining a particular trunk line slot to determine whether it is idle or in-use, checking the framing of the incoming DS0B streams, and in certain cases, generating the correct framing sequence for the outgoing DS0B streams.

FIG. 8 contains a block diagram of the port concentrator hardware configuration programmed into the PPC 600 for performance of the port concentrator function. Each of the blocks in this diagram corresponds to one of the functions listed above.

Referring to FIG. 8, the out-of-frame (OOF) detector 702 examines the framing patterns that it receives on data streams A and B from ports B and C, respectively, to determine whether or not an OOF condition exists on either stream. Specifically, the OOF detector 702 examines the three most recent framing bits of the incoming data stream to check whether or not these three are 1, 0, and 0, respectively. Since the '100' sequence occurs every five framing bits in a data stream with proper framing, the OOF detector expects to detect three of these '100' sequences every fifteen bytes. If the OOF detector detects no '100' sequences in the framing bits corresponding to the most recent fifteen bytes, then an OOF condition is said to occur.

If an OOF condition exists in the case of data stream A, the controller 602 is notified by a signal from OOF detector 702 on line 712 and subsequently refuses to acknowledge a request-to-send from its end user until the OOF condition no longer exists. As a result, the PCI unit becomes transparent to data stream A. Furthermore, frame generator 700 receives the OOF signal from the OOF detector for stream A over line 740, as described below. Meanwhile, the OOF detector 702 continues to examine groups of the three most recent framing bits. As soon as it detects three '100' sequences in fifteen consecutive framing bits, the OOF condition is said to no longer exist and the OOF signal on line 712 is removed. The OOF detector operates on data stream B in the same way.

Figure 9A:
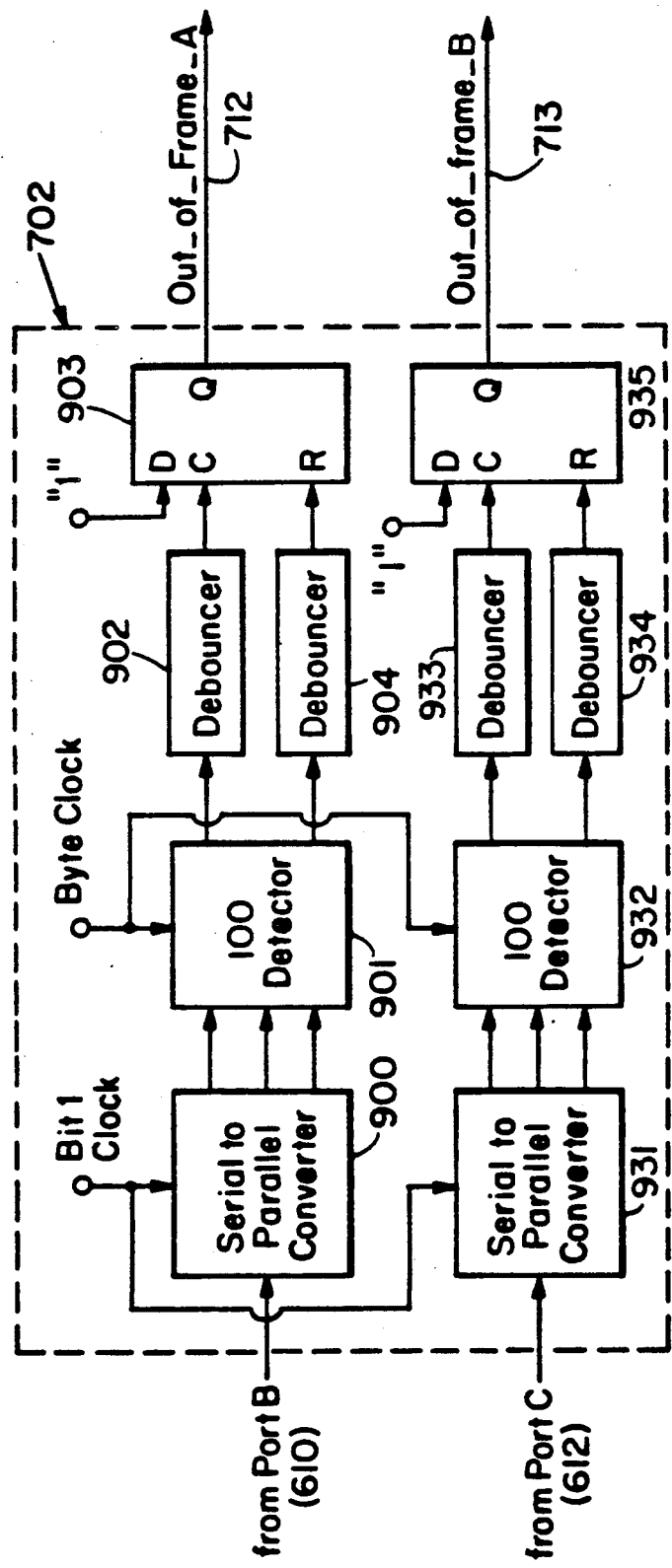
FIGS. 9(a)-(f) contain more detailed block diagrams of each of the units of FIG. 8.

FIG. 9a contains a more detailed block diagram of the OOF detector 702 of FIG. 8. The two halves of the OOF detector as shown in FIG. 9a detect framing for data streams A and B. Since the two halves are identical, the following description of the half corresponding to stream A also applies to that for stream B.

Data stream A enters a three bit serial-to-parallel converter 900 which strips the framing bit from the current DSOB data byte and places it on its output parallel interface along with the two most recently stripped framing bits. The serial-to-parallel converter 900 detects the positions of framing bits in the incoming data stream by means of a bit1 clock which has a rising edge at the beginning of the first bit of every DSOB data byte.

These three most recent framing bits are sent into a 100 detector 901, which is a three bit comparator comparing the inputted framing bits with the sequence '100'. If a match occurs, the 100 detector 901 resets debouncer 902, which is a counter that counts from 1 to 15. If a match does not occur, the debouncer continues counting, and if it reaches 15 (indicating that fifteen consecutive data bytes had no '100' framing bit sequences), the output of the debouncer 902 switches from '0' to '1'. Since the debouncer output is connected to the clock input of D flip-flop 903, whose data input is tied to '1', the rising edge of the debouncer output latches the value of '1' so that the flip-flop output OUT_OF_FRAME_A is '1'.

The output of the 100 detector 901 is also fed to a second debouncer 904, whose output is coupled to the reset input of flip-flop 903. Debouncer 904, responsible for monitoring the number of '100' sequences detected in order to escape the OOF condition, is implemented by a counter that counts from 1 to 3. This counter advances only when the output of the 100 detector is '1' and is reset when the output of debouncer 902 changes from '0' to '1'. Hence, to escape from the OOF condition, counter 904 must reach 3 before debouncer 902 reaches 15 and resets counter 904. Serial to parallel converter 931, 100 detector 932, the bouncer 933 and 934, and flip-flop 935 process the signal in stream B in a similar fashion.

The frame generator 700 on $PCI_1$ has the task of generating data stream A; that is, of inserting idle code bytes into every slot of data stream A which is received through Port B, and in particular inserting the correct framing bit into bit 1 of each idle code byte. While every PCI has a frame generator 700 and therefore has the ability to generate data stream A, only $PCI_1$ must do so, and so the frame generators of the other PCI's are essentially transparent to data stream A. However, any of the PCI's may have to generate framing in the event that the received data stream A has incorrect framing. This condition is detected by OOF detector 702 and communicated to framing generator 700 over line 740. Upon exiting the frame generator 700, data stream A proceeds to the channel monitor 704 and data inserter A 706.

Figure 9B:
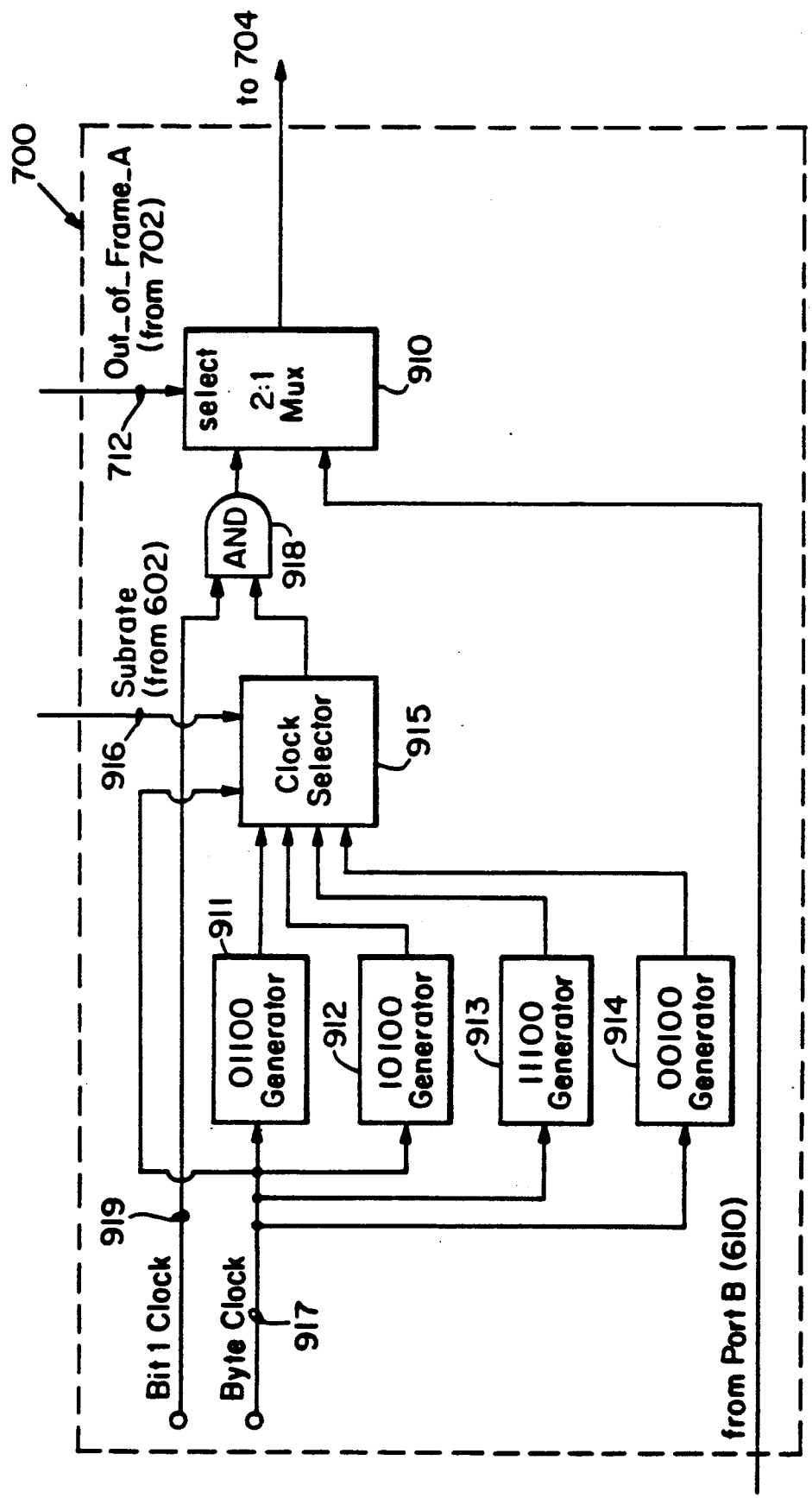

A more detailed block diagram of frame generator 700 is shown in FIG. 9b. Data stream A enters from generator 700 and proceeds directly to a first input of a 2:1 multiplexer 910. The second input of multiplexer 910 is generated by a set of frame generating subunits 911-914 in conjunction with a clock selector 915.

Recall from FIG. 4 that the framing bit sequence for the 2.4 kb/s subrate is a twenty bit sequence and that the framing bit sequences for the other two subrates are subsets of this twenty bit sequence. This sequence can be divided into four groups $G_1$, $G_2$, $G_3$, and $G_4$ of five consecutive framing bits, as seen in FIG. 5. Each of four frame generating subunits 911-914, which may be implemented by standard synchronous counters, repeatedly counts through one of the groups $G_1$-$G_4$, as shown in FIG. 9b, with the counting rate being equal to the byte rate and being supplied to subunits 911-914 by a byte clock. Hence, for a first one-byte-long interval of time, the outputs of subunits 911-914 are 0, 1, 1, and 0, respectively. For a second one-byte-long interval of time, the outputs of these subunits are 1, 0, 1, and 0, respectively, and so on for the third, fourth, and fifth intervals.

Clock selector 915, a 4:1 multiplexer, takes as input the four outputs from the set of framing generator subunits 911-914. Depending on the values of the subrate and byte clock as provided on lines 916 and 917, respectively, which values together indicate from which group the current framing bit should be taken, the clock selector chooses the output of one of subunits 911-914 as its output for a temporal duration of one byte. This output is in fact the correct framing bit for the current data byte. The clock selector output is AND'ed in AND gate 918 with a bit1 clock 919, where the value of the bit1 clock is '1' only when the first bit of a data byte in data stream A is entering multiplexer 910. Hence, the output of the AND gate is '0' for all data bit positions except for those that are framing bit positions, which take the correct framing bit values.

The output of AND gate 919 proceeds to the second input of multiplexer 910. The multiplexer chooses between the incoming stream A data bytes or the bytes generated by the combination of the framing generator subunits 911–914 and clock selector 915, with the latter chosen if OOF detector 702 detects an OOF condition and with the former chosen otherwise.

The channel monitor 704 enables the controller to read data bytes on a particular channel in the incoming streams A and B and thereby determine whether that channel is idle or in-use. The controller 602 reads data on a particular channel by sending the channel number to the channel monitor 704 over line 714 or 716. The monitor 704 upon reading line 714 or 716 waits until the data for that channel appears and then sends the data to the controller 602 over line 718 or 720. In addition, a CHANNEL_SELECT line 742 from channel monitor 704 is fed to data inserters A 706 and B 708 and data extractor 710. The CHANNEL_SELECT line indicates when data bytes corresponding to a particular channel have entered the PCI unit.

Figure 9C:
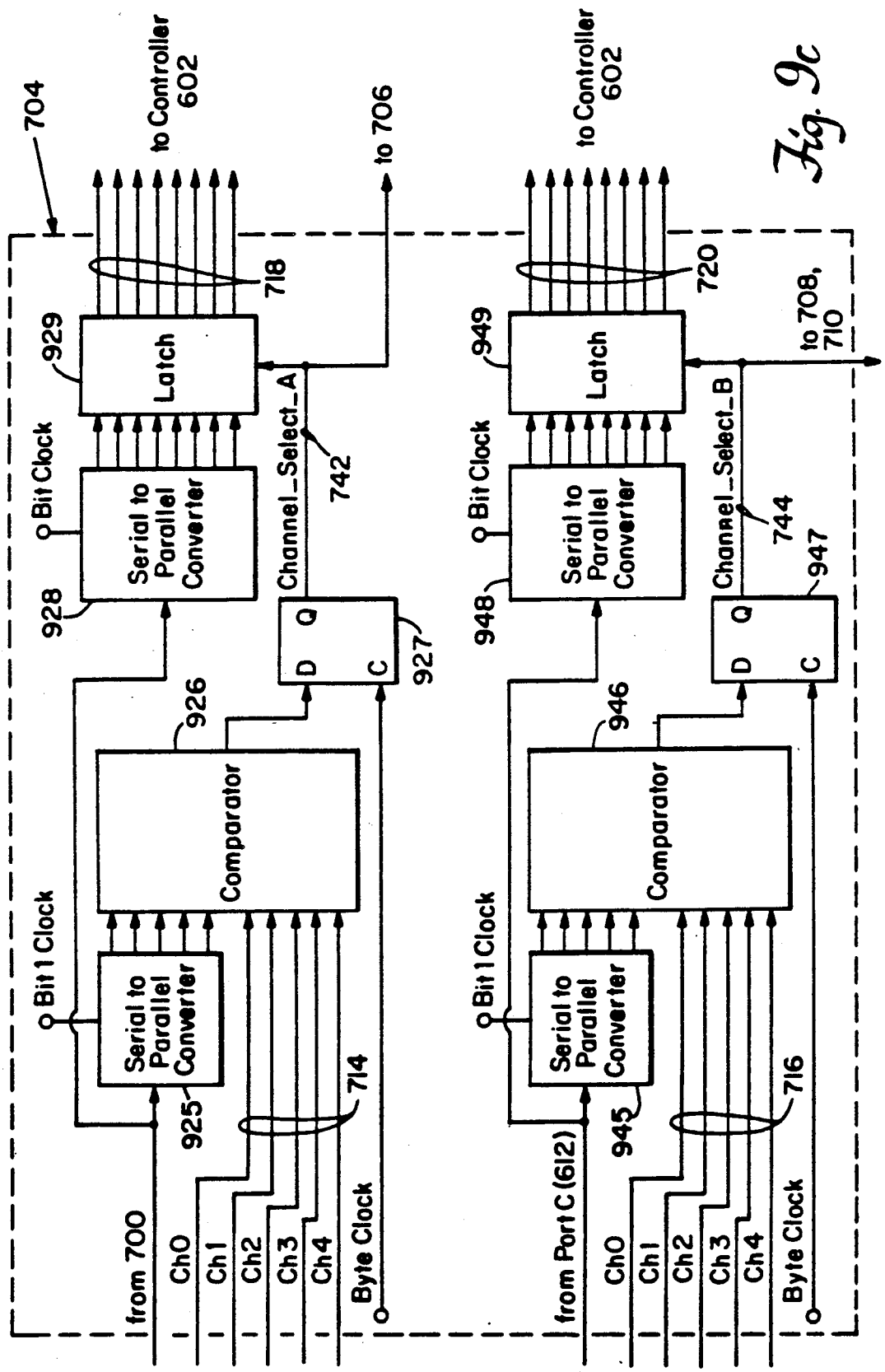
Figure 9D:
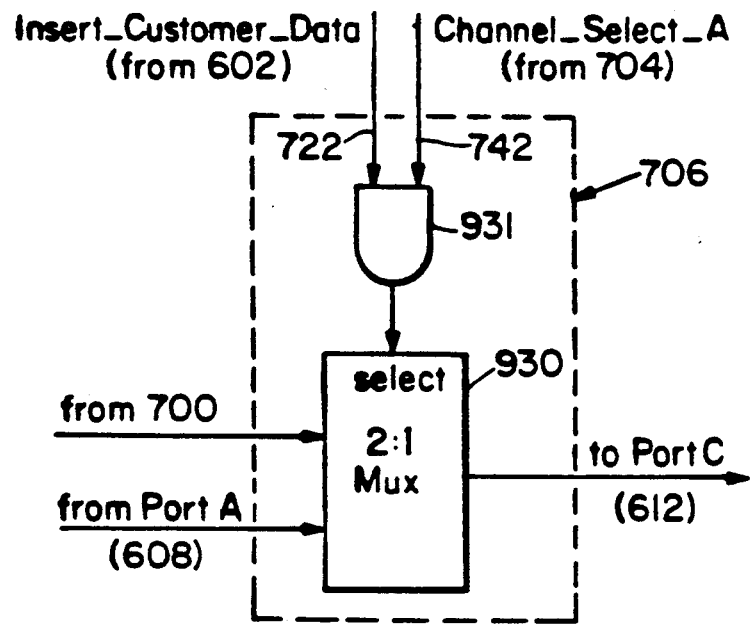

The channel monitor 704 is shown in detail in FIG. 9c and consists of two identical halves for data streams A and B. The following description refers to the half that corresponds to stream A. Five channel request lines, labelled CH0–CH4 and collectively bearing reference numeral 714, are loaded by controller 602 with values that correspond to a particular DSOB channel number. Specifically, CH0 has the value of the framing bit which corresponds to the DSOB channel being monitored. CH1–CH4 have the values of the previous (with wrap-around) four framing bits in the framing bit sequence. The serial-to-parallel converter 925 takes as input data stream A as well as a bit1 clock, strips the incoming framing bit from stream A, and places it on a parallel interface along with the four most recently stripped framing bits. These five most recent framing bits are compared with the values on lines 714 by comparator 926 to determine whether the channel that is to be monitored is currently in the PCI. The comparator indicates a match by setting its output to a '1'; otherwise, its output is '0'. This output is latched by a D-type flip-flop 927 having a byte clock connected to its clock input C. The output of flip-flop 927, referred to as CHANNEL_SELECT_A 742, indicates when the desired channel is available to be monitored.

The incoming data stream A is fed to a second serial-to-parallel converter 928 which has an eight bit parallel interface as output. These eight bits are latched by latch 929 with the CHANNEL_SELECT_A line 742 controlling the latching. Hence, the output of latch 929, which is fed to controller 602, contains the values of the data bits corresponding to the channel whose channel number is stored in lines 714.

Data inserter A 706 is used to insert data bytes into a particular channel in data stream A arriving from port B. In particular, the controller 602 instructs data inserter A to either insert end user data arriving from port A 608 or be transparent (i.e., allow data stream A to pass through the PCI unmolested), with the choice depending on whether the INSERT_CUSTOMER_DATA line 722 is '0' or '1'. If insertion is requested, the CHANNEL_SELECT-A line 742 provided by the channel monitor 704 indicates the correct time for insertion to take place. Upon exiting data inserter A 706, data stream A proceeds to port C 612. Serial to parallel converter 945, comparator 946, D-type flip-flop 947, serial to parallel converter 948, and latch 949 process the signal in stream B in a similar fashion.

FIG. 9$_d$ is a block diagram of data inserter A 706. Data stream A arriving through port B 610 is a first input of a 2:1 multiplexer 930. The end user data to be inserted, which arrives through port A, is a second input of multiplexer 930. The select line of multiplexer 930 is the output of AND gate 931, which has as its two inputs the CHANNEL_SELECT-A line 742 from the channel monitor 704 and an INSERT_CUSTOMER_DATA line 742 from the controller 602. When the select line has the value '1', i.e., when the channel in which data is to be inserted has arrived at the PCI unit through port B and when the controller wishes to insert end user data into data stream A, the output of multiplexer 930 is the end user data. Otherwise, the unmodified data stream A is the output.

Data inserter B 708 functions in much the same way as data inserter A with the exception that it either inserts the busy code byte into stream B (arriving from port C 612) or is transparent to stream B, as per the controller's instructions via the INSERT_BUSY_CODE_BYTE line 726. Again, if insertion is requested by the controller, the CHANNEL_SELECT-B line 742 provided by the channel monitor 704 indicates the correct time for insertion to take place. Upon exiting data inserter B 708, data stream B proceeds to port B 610.

Figure 9E:
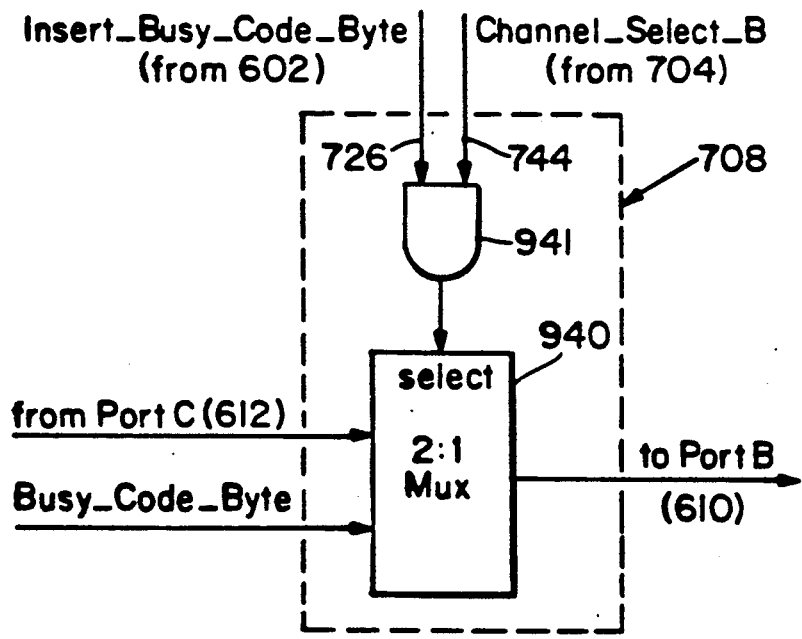

Data inserter B 708, shown in FIG. 9e, is essentially the same as data inserter A 706 of FIG. 9$_d$. Here, the two inputs of a 2:1 multiplexer 940 are data stream B, arriving from port C, and a line 728 carrying the busy code byte originating at the controller 602. The select line of multiplexer 940 is the output of AND gate 941, which has as its two inputs the CHANNEL_SELECT_B line from the channel monitor 704 and an INSERT_BUSY_CODE_BYTE line 726 from the controller 602. When the select line has the value '1', i.e., when the channel in which the busy code byte is to be inserted has arrived at the PCI unit through port C and when the controller wishes to insert the busy code byte into data stream B, the output of multiplexer 940 is the busy code byte. Otherwise, the unmodified data stream B is the output.

Finally, the data extractor 710 is used to extract data from a particular channel of data stream B arriving from port C 612 and then transmit this data to the end user over line 730. If the end user is communicating over a channel, the controller supplies the channel number to the channel monitor 704 over line 716. The channel monitor's CHANNEL_SELECT_B line indicates to the data extractor the correct time to extract the data. However, if the end user is not communicating, the controller instructs the extractor by setting line 732 to '0' to transmit the special code byte control mode idle (CMI), given by '11111110' and supplied via line 736 from the controller, to the end user.

Figure 9F:
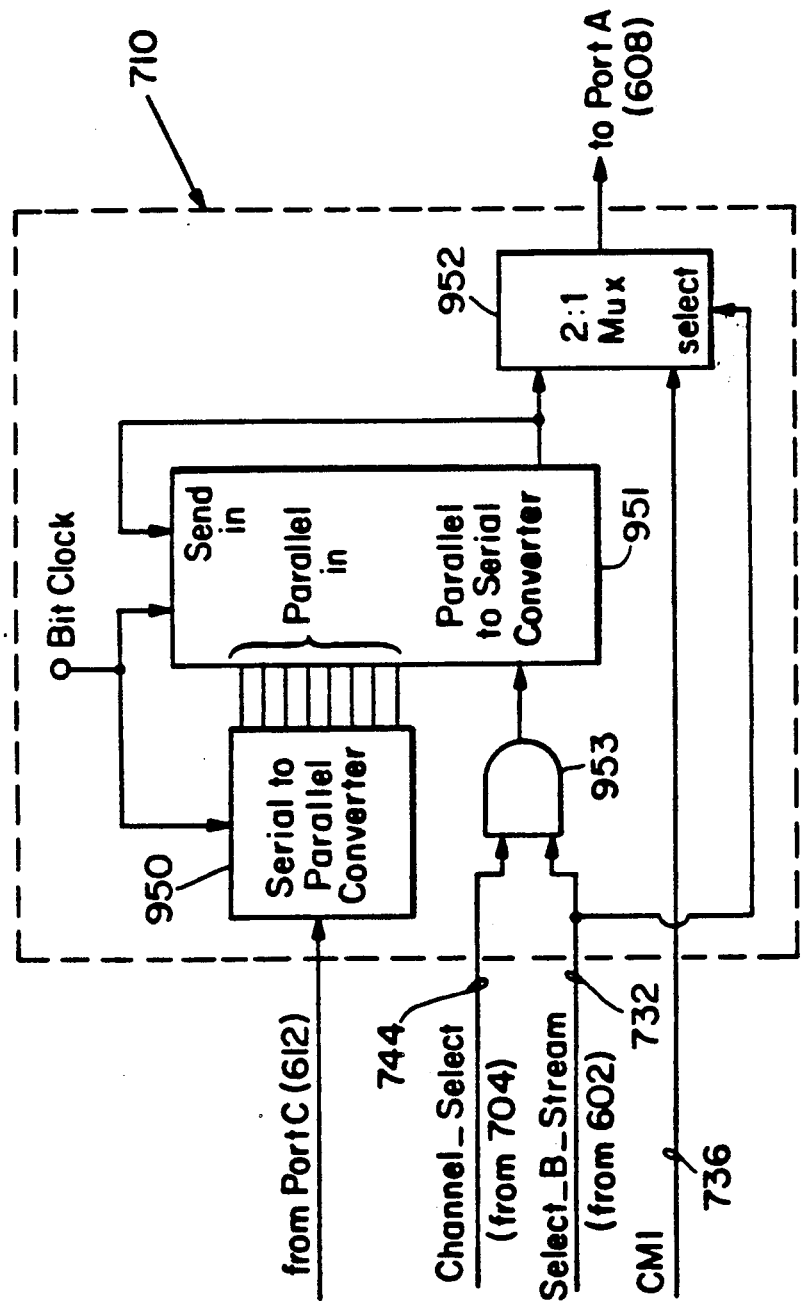

The data extractor 710 is shown in FIG. 9f. Data stream B from port C 612 enters an eight-bit serial-to-parallel converter 950 in which eight consecutive data bits are serially clocked in by means of a bit clock. These eight data bits, corresponding to a single DSOB data byte, are placed on the output parallel interface of converter 950. The eight data bits are then fed to a parallel-to-serial converter 951 which outputs the data bits in serial fashion, if the output of AND gate 953 is '1', again by means of a bit clock AND gate 953 has as its inputs the CHANNEL—SELECT line from channel monitor 704 and the SELECT—B—STREAM line from controller 602. This last step is repeated $N_{max}$ times (recall that $N_{max}$ depends on the end user subrate) to accomplish the byte-repetition that is necessary to transmit the data to the end user via the TCM loop.

The serially-outputted data is a first input of a 2:1 multiplexer 952. The second input of multiplexer 952 is the CMI special code byte. The multiplexer selects between these two inputs using the output of AND gate 953. The output of the 2:1 multiplexer 952 is sent to the end user via port A 608.

V. Equivalents

This completes the description of the preferred embodiment of the invention. Those skilled in the art may recognize other equivalents to the specific embodiments described herein, which equivalents are intended to be encompassed by the claims attached hereto.

We claim:

1. A communication system wherein a plurality of end user stations are each coupled by respective communication lines to a respective port concentration intelligent unit for communication of digital data in the form of data bytes wherein data from each of said plurality of end users is transmitted via a respective port concentration intelligent unit and over a single communication link comprised in one direction of a first data stream toward a plurality of trunk line ports and in the reverse direction of a second data stream toward said plurality of end users, said end users being interconnected via respective port concentration intelligent units with trunk lines emanating from said trunk line ports, said trunk lines being coupled to a switching network, each port concentration intelligent unit comprising:

a) first, second and third communication ports, wherein each of the end user stations is coupled to a respective one of said first ports, and the remaining two ports of each of the units are interconnected in cascade with other units, such that the third port of a first such unit is connected to the second port of a second unit and the third port of the second unit is connected to the second port of a third unit, and so on, until a last unit, herein the third port of the last unit is coupled to said plurality of trunk lines; and b) data processing circuitry, comprising a hardware circuit, a controller means, and a memory device, wherein the controller means reads data bits stored in the memory device to direct the operation of the hardware circuit in:
      i) accessing a trunk line over which the end user may communicate with said switching network, upon receiving from said end users a request for a trunk line;
      ii) repeating the access procedure, if a trunk line is not obtained in response to an end user request;
      iii) placing and removing data onto/from an accessed trunk line; and
      iv) relinquishing an accessed trunk line, upon a signal from the end user.

2. The stream of claim 1 wherein each of said data streams is partitioned in such a manner that the data corresponding to each of said trunk line ports is carried by a certain subset of data bytes in the data stream, with all data bytes in such a subset being said to belong to a particular channel of the data stream.

3. The system of claim 1 wherein every data byte, from a first data byte up to an $N_{max}^{th}$ data byte, in each of said data streams is dedicated to a particular one of said trunk line ports, and belongs to a particular one of $N_{max}$ channels of the data stream, so that $N_{max}$ consecutive data bytes in each of said streams corresponds to $N_{max}$ different trunk line ports or, equivalently, to $N_{max}$ different data stream channels.

4. The system of claim 3 wherein the data processing circuitry:
   i) accesses a trunk line by accessing a channel in said data streams;
   ii) places and removes data onto/from an accessed trunk line by placing and removing said data onto/from an accessed channel in said data streams; and
   iii) relinquishes a trunk line by relinquishing a channel in said data streams.

5. The system of claim 4 wherein individual byte positions in said data streams may comprise either data bytes originating from either an end user or the switching network or code bytes that indicate the status of the trunk line ports which correspond to said byte positions.

6. The system of claim 5 wherein said code bytes comprise:
   a) an idle code byte that indicates to a port concentration intelligent unit located relatively proximal to the plurality of trunk line ports by its presence in a channel in the first data stream that no port concentration intelligent unit located less proximal to the plurality of trunk line ports is using said channel and by its presence in a channel in the second data steam that the switching network is not transmitting over said channel;
   b) a busy code byte that indicates to said less proximal port concentration intelligent unit by its presence in a channel in said second data stream that said relatively proximal port concentration intelligent unit is using said channel; and
   c) an unassigned code byte that indicates to all port concentration intelligent units by units presence in a channel in said first data stream that a trunk line port corresponding to said channel has not trunk line connected to it.

7. The system of claim 6 wherein the correspondence between trunk line ports and data bytes in the first and second data streams is provided by a predetermined periodic binary sequence assigned to a plurality of first bits corresponding to consecutive data bytes in said data streams.

8. The system of claim 7 wherein the data processing hardware of a port concentration intelligent unit comprises:
   a) an out-of-frame detector for detecting the bit pattern of the first bits of incoming data bytes and determining whether the detected pattern is correct;
   b) a frame generator for generating a correct bit pattern if the pattern detected by the out-of-frame detector is incorrect;
   c) a channel monitor for monitoring data on specified channels of said data streams;
   d) data inserters for inserting data into an appropriate channel of said data streams; and
   e) a data extractor for extracting data bytes from the desired channel of said data stream; and f) a finite state machine comprising combinational circuitry to coordinate the operation of said out-of-frame detector, frame generator, channel monitor, data inserters, and data extractor.

9. The system of claim 8 wherein said data processing circuitry of a port concentration intelligent unit comprises a means for cycling through data stream channels to find an idle channel.

10. The system of claim 8 wherein said data processing circuitry of a port concentration intelligent unit comprises a means for repeating a search in the event that no trunk lines are available.

11. The system of claim 10 wherein said repeating means comprises a means for waiting a short period of time after an unsuccessful search and then repeating said cycling process, continuing this interleaved cycling and waiting until either an idle channel is found or the end user cancels its request for a trunk line.

12. The system of claim 8 wherein said data processing circuitry of a port concentration intelligent unit comprises a means for arbitrating among a plurality of end users that simultaneously request trunk lines.

13. The system of claim 8 wherein said data processing circuitry of a port concentration intelligent unit comprises a means for overcoming said arbitration if a plurality of end users request trunk lines at a time when no trunk lines are available, so that all of said end users have an opportunity to access the first trunk line that becomes available.

14. The system of claim 13 wherein said overcoming means comprises a means for waiting a short period of time after an unsuccessful search and then repeating said cycling process, continuing this interleaved cycling and waiting until either an idle channel is found or the end user cancels its request for a trunk line.

15. The system of claim 8 wherein said data processing circuitry of a port concentration intelligent unit comprises a means for relinquishing a trunk line upon receiving a signal from the end user corresponding to said unit, thereby allowing the first and second data streams to pass directly through said port concentration intelligent unit.

16. A communication system wherein a plurality of end user stations are each coupled by communication lines to a respective port concentration intelligent unit for communication of digital data in the form of data bytes transmitted via a respective port concentration intelligent unit and over a single communication link comprising a first data stream carrying data bytes in one direction and a second data stream carrying data bytes in a reverse direction, said end users being coupled to trunk lines emanating from trunk line ports which are coupled to a switching network, each port concentration intelligent unit comprising:
a) first, second, and third communication ports, wherein each end user station is coupled to a respective one of said first ports, and the remaining two ports of each unit are coupled to ports of other such units in a cascade arrangement; and
b) data processing circuitry comprising a controller for:
  i) accessing a trunk line upon receiving a request from an end user for a trunk line;
  ii) repeating the access procedure, if a trunk line is not obtained;
  iii) placing data onto and removing data from an accessed trunk line; and
  iv) relinquishing an accessed trunk line, upon a signal from the end user.

17. A communication system in which a plurality of end user stations are each coupled by communication lines to a respective port concentration intelligent unit for communication of digital data in the form of data bytes wherein data from each of said plurality of end users is transmitted via a respective port concentration intelligent unit and over a single communication link comprised in one direction of a first data stream toward a plurality of trunk line ports and in the reverse direction of a second data stream toward said plurality of end users, wherein said end users are interconnected via respective port concentration intelligent units with trunk lines emanating from said trunk line ports which are coupled to a switching network and wherein correspondence between trunk line ports and data bytes in the first and second data streams is provided by a predetermined periodic binary sequence corresponding to a plurality of first bits from consecutive data bytes in said data streams, each port concentration intelligent unit comprising:
a) first, second, and third communication ports, wherein each of the end user stations is coupled to a respective one of said first ports, and the remaining two ports of each of the units are interconnected in cascade with other units, such that the third port of a first such unit is connected to the second port of a second unit and the third port of the second unit is connected to the second port of a third unit, and so on, until a last unit, wherein the third port of the last unit is coupled to said plurality of trunk lines; and
b) data processing circuitry, comprising a hardware circuit, and a controller means, and a memory device, wherein the hardware circuit comprises:
  i) an out-to-frame detector for detecting the bit pattern of the first bits of incoming data bytes and determining whether the detected pattern is correct;
  ii) a frame generator for generating a correct bit pattern if the pattern detected by the out-of-frame detector is incorrect;
  iii) a channel monitor for monitoring data on specified channels of said data streams;
  iv) data inserters for inserting data into an appropriate channel of said data streams; and
  v) a data extractor for extracting data bytes from the desired channel for said data stream; and
  vi) a finite state machine comprising combinational circuitry to coordinate the operation of said out-of-frame detector, frame generator, channel monitor, data inserters, and data extractor;
and wherein the controller means reads data bits stored in the memory device to direct the operation of the hardware circuit in:
  i) accessing a trunk line over which the end user may communicate with said switching network, upon receiving from said end users a request for a trunk line;
  ii) repeating the access procedure if a trunk line is not obtained in response to an end user request by waiting for a short period of time after an unsuccessful search and then repeating said cycling process;
  iii) placing and removing data onto/from an accessed trunk line; and
  iv) relinquishing an accessed trunk line, upon a signal from the end user.

* * * * *

UNITED STATES PATENT AND TRADEMARK OFFICE
CERTIFICATE OF CORRECTION

PATENT NO. : 5,099,473
DATED : March 24, 1992
INVENTOR(S) : Dev V. Gupta, Y. Brian Chen and Kevin Stiffler It is certified that error appears in the above-identified patent and that said Letters Patent is hereby corrected as shown below:

Column 15, line 65, delete "stream" and insert ---system---.

Signed and Sealed this

Twenty-ninth Day of June, 1993

Attest:

MICHAEL K. KIRK

*Attesting Officer*  *Acting Commissioner of Patents and Trademarks*